United States Patent
König

[11] 3,785,623
[45] Jan. 15, 1974

| | | | |
|---|---|---|---|
| 3,543,698 | 12/1970 | Grubelnik | 259/185 |
| 3,547,053 | 12/1970 | Mueller | 259/185 |
| 3,561,372 | 2/1971 | Vogt | 425/100 |

[54] DOUGH PORTIONING MACHINE

[76] Inventor: Helmut König, Ursprungweg 70-72, Graz, Austria

[22] Filed: Sept. 11, 1972

[21] Appl. No.: 288,159

Related U.S. Application Data

[63] Continuation-in-part of Ser. No. 232,756, March 8, 1972, Pat. No. 3,733,058.

[30] Foreign Application Priority Data
Sept. 13, 1971 Austria.................................... 7938

[52] U.S. Cl................................. 259/185, 425/99
[51] Int. Cl........................................ A21c 7/06
[58] Field of Search....................... 259/185; 425/99, 425/100, 101, 98, 97, 96

[56] References Cited
UNITED STATES PATENTS
1,960,367   5/1934   Bellingroth .......................... 425/170

*Primary Examiner*—Robert W. Jenkins
*Attorney*—Eric H. Waters et al.

[57] ABSTRACT

Dough to be portioned is filled into a hopper, which leads to a chamber from which the dough is forced by means of a plunger into pocket openings arranged on the circumference of a rotating drum. Two rotary members are arranged in the hopper, each of which carries three blades serving for preportioning the dough. Below the rotary members a dough sensing means is arranged responsive to the quantity of dough delivered by the rotary members to the chamber. The dough sensing means cooperate with a switch for stopping the movement of the rotary members, if too much dough is delivered to the chamber.

10 Claims, 5 Drawing Figures

DOUGH PORTIONING MACHINE

This application is a continuation-in-part of my copending application Ser.No. 232,756 filed Mar. 8, 1972, now U.S. Pat. No. 3,733,058.

My present invention relates to a machine for portioning dough, and more particularly, to a machine for delivering predetermined quantities of dough into pocket openings arranged on the circumference of a rotating drum.

In my copending application identified above, I have disclosed a machine for this purpose including a machine frame in which a shaft is horizontally journalled. A drum is rotatably mounted on said frame around the shaft and a a dough supply station having a hopper to supply the dough to the drum is situated beneath the circumference of the drum. The drum has a plurality of pocket openings on its circumference arranged in a plurality of rows, which pocket openings receive the dough from the hopper by means of a gate-like plunger member common for all pocket openings for one row. The plunger is driven for reciprocating movements from a motor and is slidingly guided in a chamber which is connected to the hopper and receives the dough therefrom.

Experience has shown that a device of the kind indicated above sometimes has the disadvantage that the dough in the hopper is subjected to a too strong movement, which may have a detrimental influence upon the dow. Furthermore, there is sometimes the disadvantage that a column of dough rest in the hopper remains and does not proceed to the chamber so that the plunger effects a void stroke or delivers dough portions having a dough weight considerably less than the predetermined value. However, it may also happen that too much dough enters the chamber guiding the plunger. This may cause the disadvantage of squeezing the dough and there are many different kinds of dough, which are very sensitive to such a squeeze.

It is an object of the invention to overcome these disadvantages in a practical manner. It is a further object of the invention to reduce the squeezing forces on the dough. It is another object of the invention to provide a machine of the kind indicated above, in which the danger of delivering dough portions having too little weight is avoided. It is another object of the invention to provide for a simple and efficient portioning of the dough even for varying dough qualities. It is a further object of the invention to provide for a machine in which the dough is handled carefully. It is a further object of the invention to provide for a machine in which the delivery of dough into the plunger chamber is stopped, if too much dough is already present in this chamber.

This invention essentially consists in a dough portioning machine, comprising a machine frame, a shaft horizontally journalled in said frame, a drum rotatably mounted on said frame around said shaft, a dough supply station having a hopper to supply dough to a chamber forming with said hopper a dough reservoir, a plurality of pocket openings arranged in rows on the circumference of said drum to receive the dough from said chamber, a plunger means guided in said chamber and serving for feeding the dough into said pocket openings, a first drive means for imparting a step-wise rotating movement to said drum, a second drive means for imparting a reciprocating movement to said plunger, a preportioning means arranged within said hopper and having two rotary members rotatably mounted on horizontally disposed axes, each of said rotary members having blades on its circumference for cutting off the dough, a third drive means for imparting a unison rotational movement with the same angular velocity but in opposite directions to said rotary members, and a dough sensing means arranged within said dough reservoir and being responsive to the quantity of dough in said dough reservoir and being operatively connected to said third drive means so that the rotational movement of said rotary members is stopped, if the quantity of dough in said dough reservoir exceeds a predetermined value.

Thus, the disadvantages of the construction according to the standard of art are completely overcome and efficient preportioning of the dough is achieved so that the dough is handled carefully. Within the inventive construction it is no more possible that a column of dough rests in the hopper, so that a reliable feeding of dough to the pocket opening of the drum is achieved. It is also avoided that too much dough is delivered into the dough reservoir which might cause a squeezing action on the dough. If the quantity of dough present in the dough reservoir exceeds a predetermined value, the dough sensing means is so actuated that the rotational movement of the rotary member is stopped so that no more dough is delivered into the dough reservoir. Therefore, the rotary members do not always rotate but only then if the quantity of dough present in the dough reservoir is below a predetermined value so that the dough has to be delivered into the dough reservoir for securing a reliable portioning dosis.

Further objects and advantages of the invention will become evident from the following description of embodiments of the invention illustrated by way of example in the accompanying schematical drawings, in which FIG. 1 shows a vertical section through a first embodiment of the invention.

FIG. 5 shows a generic view of the machine.

Figure 1:
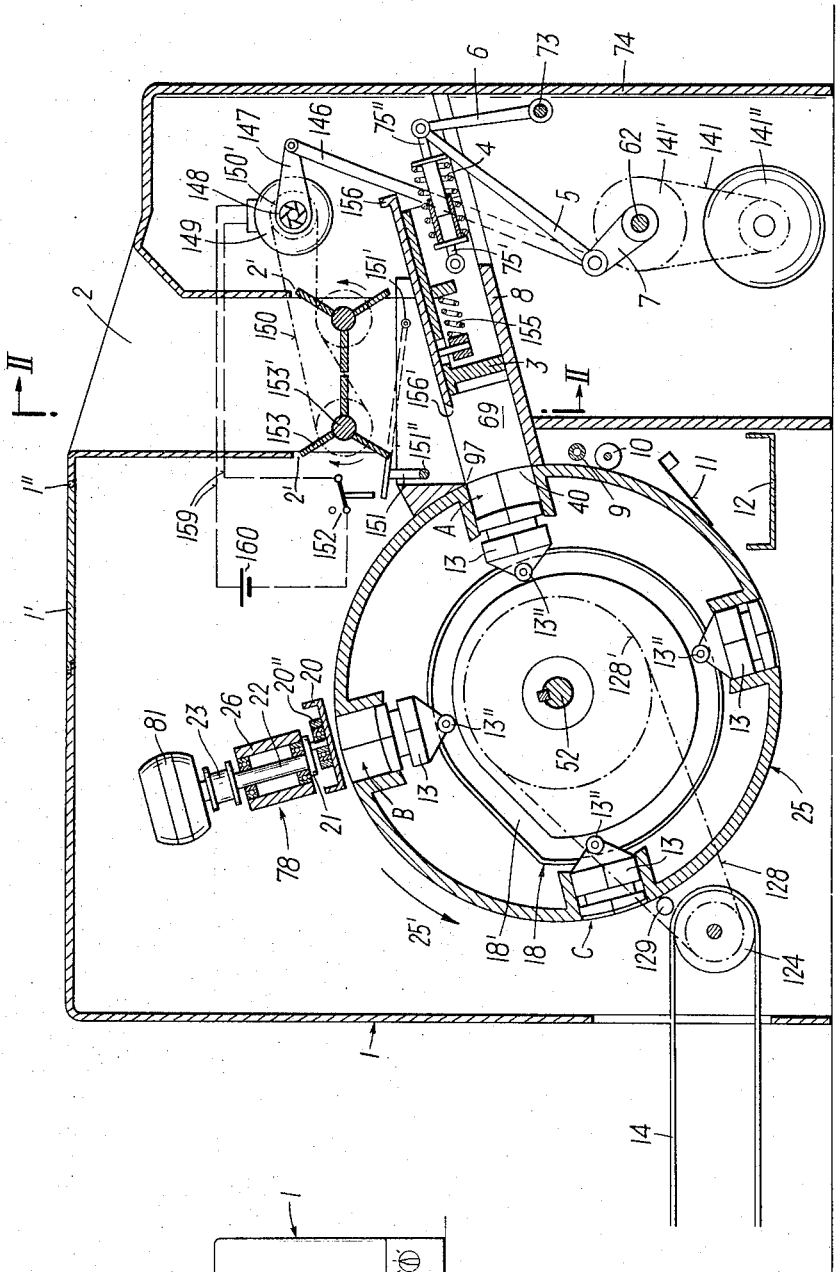

The machine according to FIG. 1 serves for portioning and kneading of dough pieces. The machine has a frame and a housing generally indicated by 1, which housing comprises a hopper 2 into which the dough is filled in. This hopper extends nearly over the whole width of the housing 1. The hopper 2 leads the dough to a chamber 69 where the dough rests on a bottom wall 8 of this chamber. The sidewalls and the bottom 8 of this chamber 69 serve as a guide for the plunger member 3 reciprocably mounted in this chamber 69 and being driven to reciprocating movements from a main driving shaft 62 journalled in the housing 1 via a crankarm 7, a connecting link 5 and a push-member consisting of two elements 75' 75'' telescopically arranged one into the other. Each of these elements 75',75'' has a flange and a spring 4 is inserted between and abuts against these flanges. The member 75' is pivotally connected to the plunger member 3. Thus, the plunger 3 is resiliently driven to reciprocating movements so that a faulty adjustment of the machine, which leads to too voluminous quantities of dough within the chamber 69, will not have any detrimental influence upon the drive means driving the plunger member 3.

For better guiding the plunger member 3, the link member 5 and the member 75" linked thereto are pivotally connected to a guiding rod 6 journalled for swinging movement near the rear wall 74 of the housing 1 by means of an axis 73.

The dough is forced from the chamber 69 which extends substantially over the whole width of the machine, into pocket openings 40 arranged on the circumference of a rotatably mounted drum 25 in four rows. The drum 25 is rotatably mounted on an axis journalled in the sidewalls of the housing 1. The four rows of the pocket openings 40 are spaced apart from each other in equal distances. Each row comprises eight pocket openings 40. The drum 25 is driven from an electric motor 141" to a stepwise rotational movement in the direction of the arrow 25 ' by means of a suitable linkage means (not shown), which is described in greater detail in my copending application Ser. No. 232,756, now U.S. Pat. No. 3,733,058. By this stepwise rotational movement of the drum 25 the pocket openings 40 one after another pass the chamber 69. In each of the pocket openings 40 a piston 13 is guided. Each piston 13 has a hectogonal Cross-section corresponding to the hexagonal cross-section of the corresponding pocket openings 40. The pistons 13 are reciprocally guided within the pocket opening 40 and are driven for such reciprocal movement by means of a camdisc 18 provided with a groove 18' guiding guide rollers 13" pivotally connected to the pistons 13. The camdisc 18 is mounted on the axis 52 of the drum 25 so that a relative angular movement between the camdisc 18 and the drum 25 is possible. By this relative angular movement the pistons 13 are reciprocally moved in the pocket openings 40. The adjustment is made that such that on a dough portioning and supply station A of the machine the piston 13 in each pocket opening 40 is retracted to such an extent that the pocket openings 40 can receive a predetermined quantity of dough. On a kneading station B having a kneading device 78 mounted above the drum 25, the dough pieces contained within the pocket openings 40 are kneaded so that they are brought into a spherical or ball-shaped configuartion . The kneading station B follows the dough portioning station A seen in direction of movement of the drum 25 and is spaced apart therefrom a distance, which is substantially equal to an angle of 90° of the circumference of the drum 25. The kneading device 78 comprises a kneading plate 20 provided in a manner known per se with recesses. The kneading plate 20 is mounted by means of roller bearings 20" on pins excentrically arranged on disks 21 driven to rotational movement by shafts 22 rotatably journalled in a carrier member 26 of the kneading device 78. The shafts 22 are driven to rotational movement from an electromotor 81 by means of a toothed belt 23. This arrangement is described more in detail in my copending application Ser.No. 232,756, now U.S. Pat. No. 3,733,058.

Following the kneading station B (seen in direction of movement of the drum 25) there is provided a dough piece ejection station C. In this station the kneaded dough pieces are ejected from the pocket openings 40 by means of an outward movement of the pistons 13 cooperating with the cam-disk 18. The ejected dough pieces fall on a conveyor belt 14 guided over a driving roller 124 driven for rotational movement in synchronism with the drum 25. For this purpose the roller 124 is connected by a chain 128 to a toothed driving-wheel 128' mounted on the axis 52 of the drum 25. Between the roller 124 and the circumference of the drum 25 an intermediate roller 129 is provided for more carefully passing the ejected dough pieces on to the conveyor belt 14.

Beneath drum 25 there is provided an oil-feeding tube 9 feeding oil on to the circumference of an oildividing roller 10 contacting the circumference of the drum 25. Beneath the roller 10 there is provided a resilient stripper means 11, which cleans the circumference of the drum 25. The stripped-off quantities of dough and oil are collected by means of a cup 12.

Figure 2:
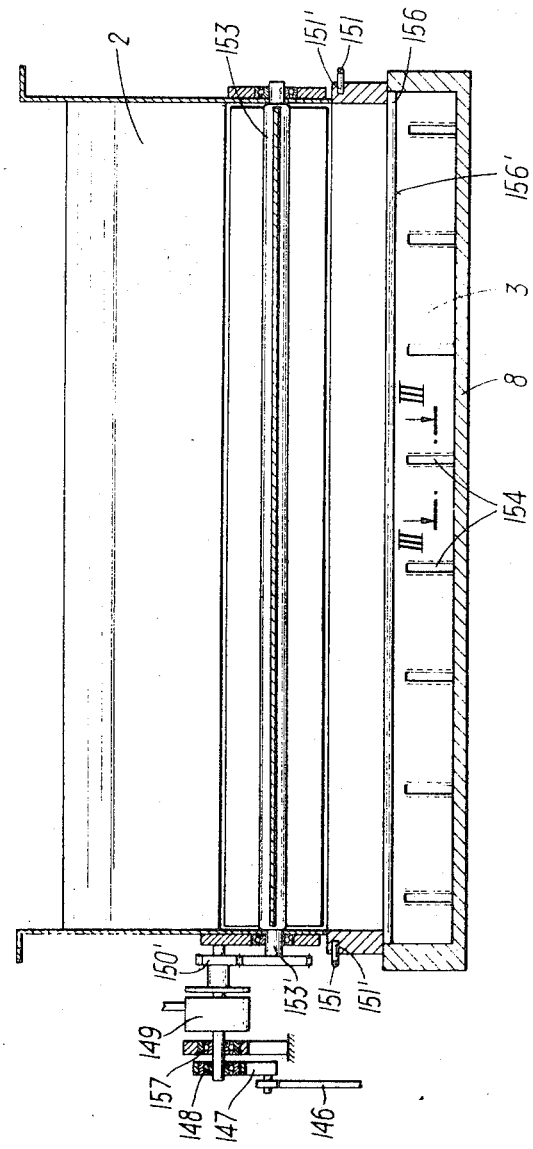
FIG. 2 is a cross-section of parts of the machine according to FIG. 1 taken along the lines II—II of FIG. 1.

Within the hopper 2 there is provided a preportioning means for the dough, comprising two rotary members 153 having parallel extending horizontally arranged driving shaft 153'. Each driving shaft carries three blades extending radially from the driving shaft. The two driving shafts 153' are disposed parallel to each other across the width of the hopper 2, and at one side thereof, they project through the wall of the hopper 2 ( FIG. 2) and the sections of the driving shafts 153' extending beyond the walls of the hopper 2 are connected to a suitable drive means. This drive means comprises pinnions keyed to the shaft 153'. Each pinion is driven by a chain 150 which is so mounted on the pinnions that the pinnions and the driving shaft 153' are always rotated in unison and at the same angular velocity, but in opposite directions. The chain 150 is fed over a toothed driving whell 150' driven from a crank 147 pivotally connectec by means of a link 146 to the crank-arm 7. However, the wheel 150' is not directly driven from the crank 147 but via an intermediate electromagnetic coupling 149, a ratchet and pawl device 157 and a free-wheel drive 148 ( FIGS. 1 and 2). The ratchet and pawl device 157 and the free-wheel drive 148 together prevent the rotary members 153 from being rotated merely by the influence of the weight of the dough filled into the hopper 2 and resting on the blades of the rotary members 153.

The electromagnetic coupling 149 is controlled by a dough sensing means comprising two til-table levers 151 pivotally connected to the walls of the hopper 2 and connected to a rod 151" running along the whole width of the chamber 69 and resting on the dough present in this chamber. The levers 151 are pivotally connected to the walls of the hopper 2 by means of axes 151', inserted into holes of the hopper 2 or the chamber 69, respectively. During the forward movement of the plunger member 3 in the chamber 69 the dough in this chamber is so displaced that a quantity of dough comes into contact with the rod 151" so that this rod 151" is lifted. Above this rod 151" or above one of the levers 151 there is provided an electric switch 152 inserted into the electric circuit supplying the electric energy from a suitable source 160 of electric energy, e.g. a battery, by means of lead lines 159 to the electromagnetic coupling 149. When the rod 151" is lifted by the dough, the switch 152 is so actuated that this electric circuit is interrupted so that the drive means for the rotary members 153 is made inoperative. Therefore, the rotary members 153 stand still if there is a sufficient quantity of dough present in the chamber 69 or the lower portion of the hopper 2 situated below the rotary members 153. Thus, it is avoided that dough is delivered by the rotary members 153 to the chamber 69, even when this chamber is completely filled with dough. Such a sensing of the quantity of dough present in the chamber 69 is of great importance, if the quantity of dough received by the pocket openings 40 at the portioning station A is variable, e.g. by amending the angular relationship between the cam-disk 18 and the drum 25 so that the pistons 13 are projected or retracted in the pocket openings 40. A device suitable for this purpose is described in greater detail in my copending application Ser.No. 232,756, now U.S. Pat. No. 3,733,058 and consists substantially of an arm (not shown) pivotally mounted on a hub keyed onto the shaft 52, which hub has a tooth rim being in engagement with a worm mounted for rotation in the arm. A pinion is fixed to the shaft of this worm and is in engagement with a further worm mounted for rotation in the arm. On the shaft of this latter worm a pinion is secured, which is connected for rotation by means of a chain with a pinion mounted for rotation on the shaft 52 and is secured for common rotation to a hand-wheel 88 (FIG. 5). By rotation of this hand-wheel 88 the shaft 52 and therefore the cam-disk 18 keyed onto it can be rotated with respect to the drum 25. Thus, the angular relationship of the cam-disk 18 relative to the drum 25 can be varied so that depending on the direction of this movement the quantity of dough filled into the pocket openings at the portioning station A can be increased or decreased, respectively.

As it is shown in FIG. 1, the plunger member 3 comprises an upper member 156 having a sharp front edge 156'. To the upper member 156 a pin is fixed and a compression spring 155 is inserted between this pin and an abutment fixed to the plunger member 3. The upper member 156 cuts off a quantity of dough by means of its sharp front edge 156 from the lump of dough present in the chamber 69 and the hopper 2, respectively, which quantity of dough is forced into the pocket opneings 40 by the plunger member 3. The proper portioning is effected by imparting a rotational movement to the drum 25 in the direction of the arrow 25' so that a sharp edge 97 shears off the portions of dough extending beyond the pocket openings 40. This movement of the drum 25 may be effected by a suitable drive means (not shown), e.g. a crank-arm fixed to the shaft 62 and acting via a rod on a ratchet and pawl mechanism fixed to the sidewalls of the drum 25. Such a mechanism is shown in my copending application Ser. No. 232, 756, now U.S. Pat. No. 3,733,058.

Figure 3:
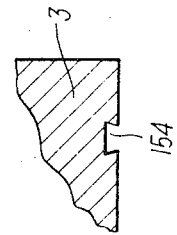
FIG. 3 shows a detail of the embodiment according to FIGS. 1 and 2 in a larger scale and in section taken along the lines III—III of FIG. 2.
Figure 4:
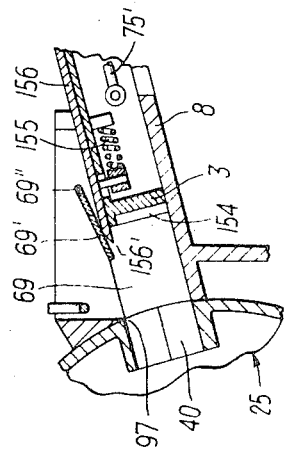
FIG. 4 shows a second embodiment in a section similar to FIG. 1.

On the front wall of the plunger member 3 there are provided vertically disposed grooves 154 ( FIGS. 1,2,3) having a dovetail cross-section. When the plunger member 3 effects its forward stroke, the dough enters these grooves and thus the dough is retracted from the drum 25 when the plunger member 3 makes its backward stroke. A flap member 69' (FIG. 4) may be provided in the chamber 69, which flap member is connected for pivotal movement around an axis 69'' fixed to the sidewalls of the chamber 69. This flap member 69' serves for forwardly tilting the dough adhering to the plunger member 3 during the backward stroke thereof, whereby the dough comes free from the dovetail-shaped grooves 154. Thus, it is secured that always dough pieces having a smooth surface are delivered into the pocket openings 40 so that the rough surface portions of the dough pieces which are produced by the shearing effect of the shearing edge 97 are completely smoothed. During the backward stroke of the plunger member 3 the dough portions contacting the drum 25 are retracted and by this retracting movement these dough portions are tilted by the influence of a flap member 69', which prevents that the dough is transported by the plunger member 3 up to the backward deadpoint of its movement. Furthermore, the flap member 69', which become operative during the backward movement of the plunger member 3 prevents that the dough is turned too much during the backward movement of the plunger member 3. Thus, it is avoided that during the following forward stroke of the plunger member 3 the dough is subject to tears on its surface.

As it is apparent from the drawings, the grooves 154 end spaced apart from the upper surface of the plunger member 3. Thus, it is avoided that during the forward stroke of the plunger member 3 the dough can escape along the grooves 154 when the dough is pressed into the pocket openings 40.

The hopper 2 has openings 2' in its walls through which the radially arranged wings of the rotary members 153 project during their rotational movement. Thus, the function of the rotary members 153 can be inspected from the outside of the hopper 2. In order to make the outside of the hopper 2 better visible from the outside of the machine housing 1, on the bottom wall thereof there is provided a cover member 1' tiltable around an axis 1''. By lifting this cover member 1' the movement of the rotary members 153 can easily be observed.

I claim:

1. A dough portioning machine, comprising a machine frame, a shaft horizontally journalled in said frame, a drum rotatably mounted in said frame around said shaft, a dough supply station having a hopper to supply the dough to a chamber forming with said hopper a dough reservoir, a plurality of pocket openings arranged in rows on the circumference of said drum to receive the dough from said chamber, a plunger means guided in said chamber and serving for feeding the dough into said pocket openings, a first drive means for imparting a stepwise rotating movement to said drum, a second drive means for imparting a reciprocating movement to said plunger, a preportioning means arranged within said hopper and having two rotary members rotatably mounted on horizontally disposed axes, each of said rotary members having blades on its circumference for cutting off the dough, a third drive means for imparting a unison rotational movement with the same angular velocity but in opposite directions to said rotary members, and a dough sensing means arranged within said dough reservoir and being responsive to the quantity of dough in said dough reservoir and being operatively connected to said third drive means so that the rotational movement of said rotary members is stopped if the quantity of dough in said dough reservoir exceeds a predetermined value.

2. A machine as defined in claim 1 wherein said dough sensing means comprises a pivotally arranged lever, and a switch means, said third drive means comprises an electromagnetic coupling and a circuit for supplying electric energy to said electromagnetic coupling, said switch means being inserted into said electric circuit so that this circuit is interrupted when the switch is actuated by the lever.

3. A machine as defined in claim 1 wherein said third drive means comprises two pinions fixed to said axes of said rotary members, a chain and a toothed drive wheel, said chain connecting said pinions with said drive wheel, a pawl and ratchet mechanism disposed on the axis of said drive wheel, a main driving shaft and a linkage means connecting said pawl and ratchet means to said main driving shaft, so that said axes of said rotary members are intermittently driven from said main driving shaft.

4. A machine as defined in claim 1 wherein said third drive means comprises a ratchet means which prevents rotation of said rotary members under the influence of the weight of the dough in the hopper above said rotary members.

5. A machine as defined in claim 1 wherein said plunger member has a front surface, at least one groove being provided on said front surface.

6. A machine as defined in claim 5 wherein said groove has a dove-tail shaped cross-section.

7. A machine as defined in claim 5 wherein a plurality of vertical grooves are provided on said front surface of said plunger member, said plunger member has an upper surface, said grooves ending spaced apart from said upper surface.

8. A machine as defined in claim 5 wherein a pivotally supported flap member is provided, said plunger member having an upper front edge, said flap member contacting said upper front edge.

9. A machine as defined in claim 1 wherein said dough reservoir has walls, openings being provided in said walls, said rotary member extending through said openings.

10. A dough portioning and kneading machine, comprising a machine frame, a shaft horizontally journalled in that frame, a drum rotatably mounted on said frame around said shaft, a dough supply station having a hopper to supply the dough to a chamber forming with said hopper a dough reservoir, a plurality of pocket openings arranged in at least three rows on the circumference of said drum to receive the dough from said dough reservoir, pistons reciprocally guided in each of said pocket openings, cam surfaces cooperating with said pistons for moving said pistons in said pocket openings, a kneading station having a kneading device mounted above said drum and having a kneading tool adapted for movement along a circular path for kneading the dough in said pocket openings, a plunger member guided in said chamber and serving for feeding the dough into said pocket openings, a first drive means for imparting a stepwise rotating movement to said drum, a second drive means for imparting a reciprocating movement to said plunger, a preportioning means arranged within said hopper and having two rotary members rotatably mounted on horizontally disposed axes, each of said rotary members having blades on its circumference for cutting off the dough, a third drive means for imparting a unison rotational movement with the same angular velocity but in opposite directions to said rotary members, a dough sensing means arranged within said dough reservoir and being responsive to the quantity of dough in said dough reservoir and being operatively connected to said third drive means so that the rotational movement of said rotary members is stopped if the quantity of dough present in said dough reservoir exceeds a predetermined value, a forth drive means to effect said movement of said kneading tool, a dough ejecting station situated on the descending part of said rotational movement of said drum, said pocket openings passing one after another said dough supply station, said kneading station and said ejecting station during said movement of said drum, at least one cam means carrying said cam surfaces and being connected for rotation to said shaft, and means for imparting a rotational movement of said cam means around said shaft relatively to said drum during the steps of movement of the drum.

* * * * *